(12) United States Patent
Saito et al.

(10) Patent No.: US 10,758,977 B2
(45) Date of Patent: Sep. 1, 2020

(54) SILVER NANOWIRES AND METHOD FOR PRODUCING SAME, AND SILVER NANOWIRE INK AND TRANSPARENT CONDUCTIVE FILM

(71) Applicant: DOWA ELECTRONICS MATERIALS CO., LTD., Tokyo (JP)

(72) Inventors: Hirotoshi Saito, Tokyo (JP); Kimitaka Sato, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 101 days.

(21) Appl. No.: 16/301,749

(22) PCT Filed: Jun. 1, 2017

(86) PCT No.: PCT/JP2017/020410
§ 371 (c)(1),
(2) Date: Nov. 15, 2018

(87) PCT Pub. No.: WO2017/209230
PCT Pub. Date: Dec. 7, 2017

(65) Prior Publication Data
US 2019/0283128 A1 Sep. 19, 2019

(30) Foreign Application Priority Data
Jun. 2, 2016 (JP) ................. 2016-111260

(51) Int. Cl.
| | |
|---|---|
| *B22F 1/00* | (2006.01) |
| *C09D 11/52* | (2014.01) |
| *H01B 1/00* | (2006.01) |
| *B82Y 30/00* | (2011.01) |
| *H01B 1/22* | (2006.01) |

(Continued)

(52) U.S. Cl.
CPC .............. *B22F 1/0025* (2013.01); *B22F 1/00* (2013.01); *B22F 1/0062* (2013.01); *B22F 1/02* (2013.01); *B22F 9/24* (2013.01); *B82Y 30/00* (2013.01); *C09D 11/52* (2013.01); *H01B 1/00* (2013.01); *H01B 1/22* (2013.01); *H01B 5/14* (2013.01);
(Continued)

(58) Field of Classification Search
CPC ..... C09D 11/037; C09D 11/52; B22F 1/0044; B22F 1/0062; B22F 2301/255
See application file for complete search history.

(56) References Cited

U.S. PATENT DOCUMENTS

2016/0114393 A1    4/2016  McGouch et al.

FOREIGN PATENT DOCUMENTS

| JP | 2014-224199 | 12/2014 |
|---|---|---|
| JP | 2015-180772 | 3/2015 |

(Continued)

*Primary Examiner* — Alexandre F Ferre
(74) *Attorney, Agent, or Firm* — Clark & Brody LP

(57) ABSTRACT

To provide thin and long silver nanowires covered with an organic protective agent containing a less amount of impurities, the silver nanowires having good dispersibility in an ink having an alcohol added thereto. Silver nanowires containing covered thereon a copolymer composition containing one or more kinds of a copolymer having a vinylpyrrolidone structural unit, and having a sulfur content Sppm of 2,000 ppm or less and a residual vinylpyrrolidone monomer content ratio $VP_R$ obtained from an NMR spectrum of 6.0% or less, the silver nanowires having an average diameter of 30 nm or less and an average length of 10 μm or more.

11 Claims, 5 Drawing Sheets

(51) Int. Cl.
*B22F 1/02* (2006.01)
*H01B 5/14* (2006.01)
*H01B 13/00* (2006.01)
*B22F 9/24* (2006.01)

(52) U.S. Cl.
CPC ........ *H01B 13/00* (2013.01); *B22F 2301/255* (2013.01); *B22F 2302/45* (2013.01)

(56) References Cited

FOREIGN PATENT DOCUMENTS

| | | |
|---|---|---|
| WO | 20141092501 | 6/2014 |
| WO | 2015/133453 | 9/2015 |
| WO | 2016/114370 | 7/2016 |

[Fig.1]
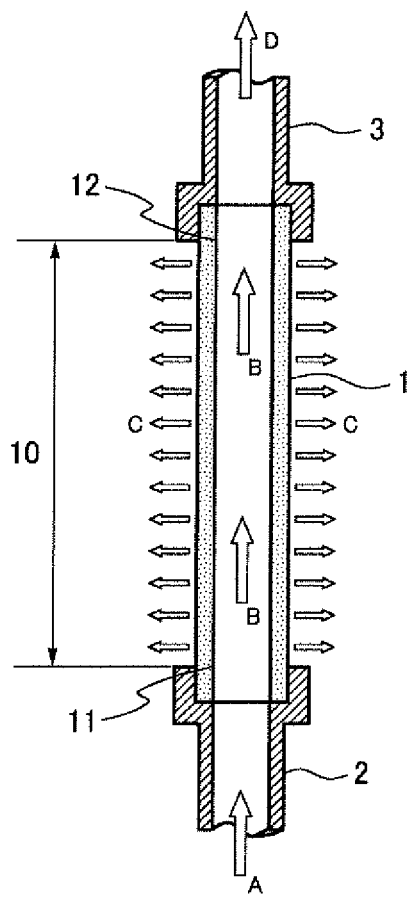

[Fig.2]
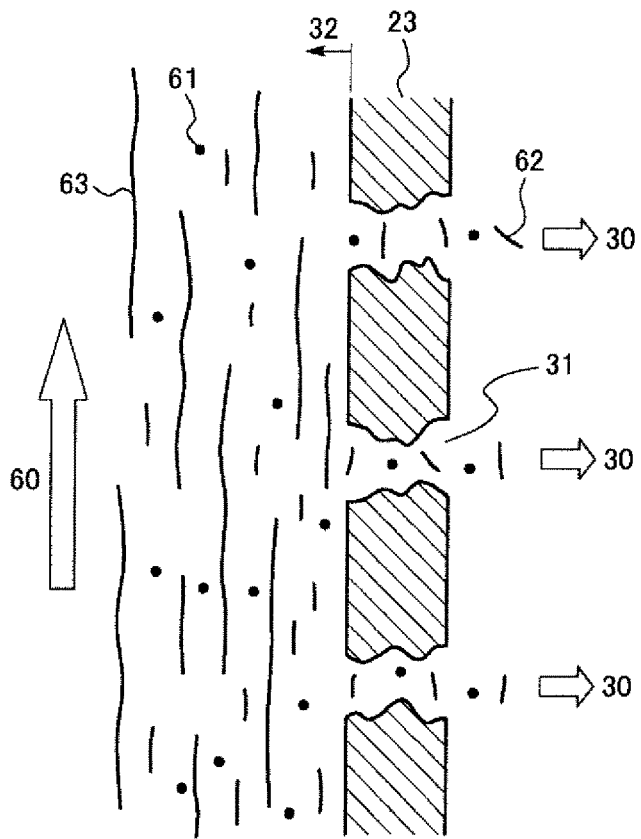
[Fig.3]
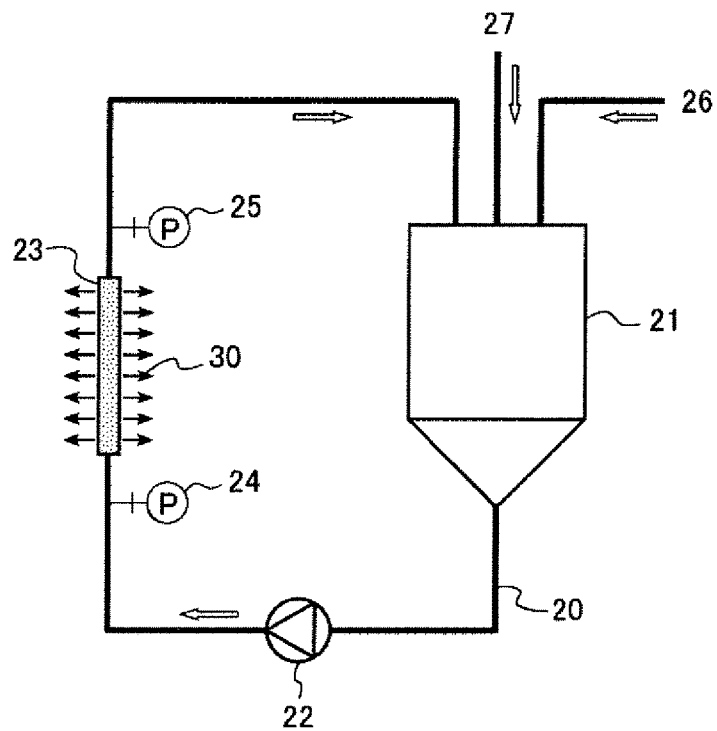

[Fig.4]
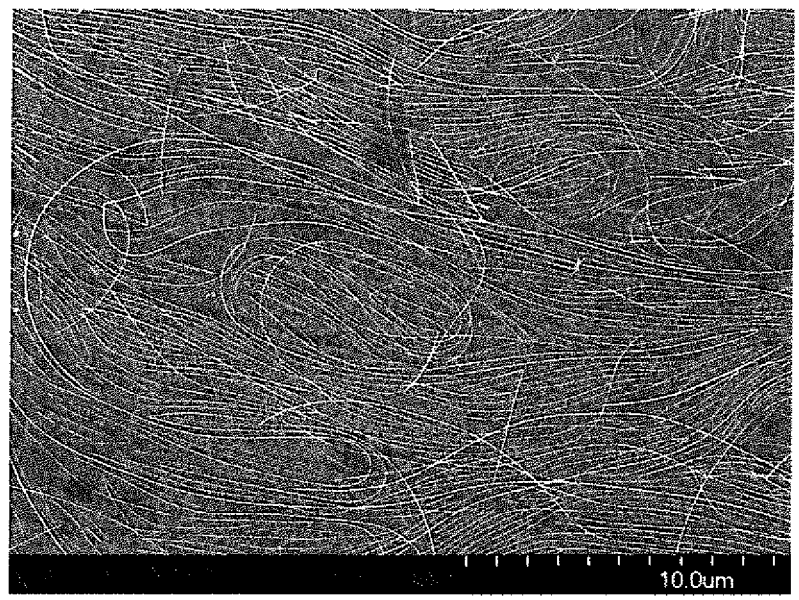
[Fig.5]
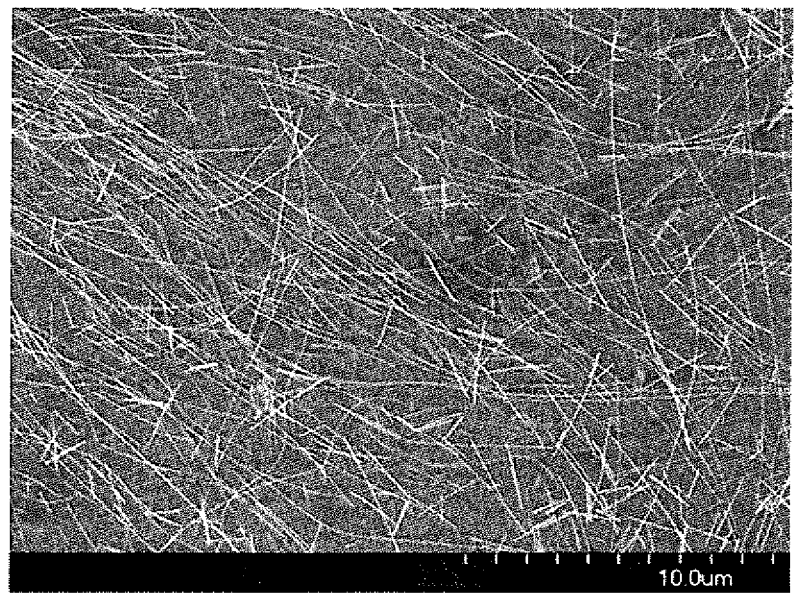

[Fig.6]
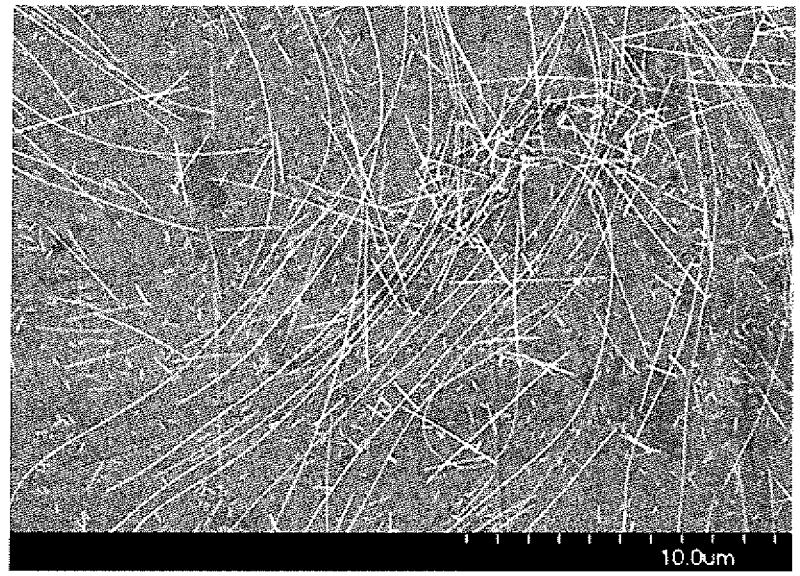
[Fig.7]
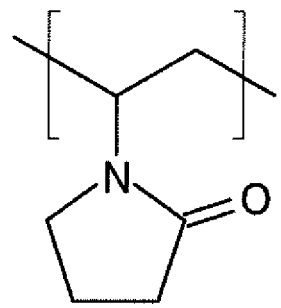
[Fig.8]
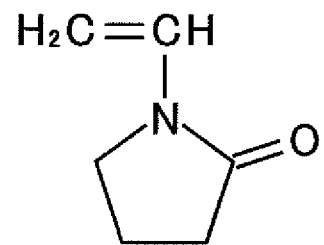

[Fig.9]
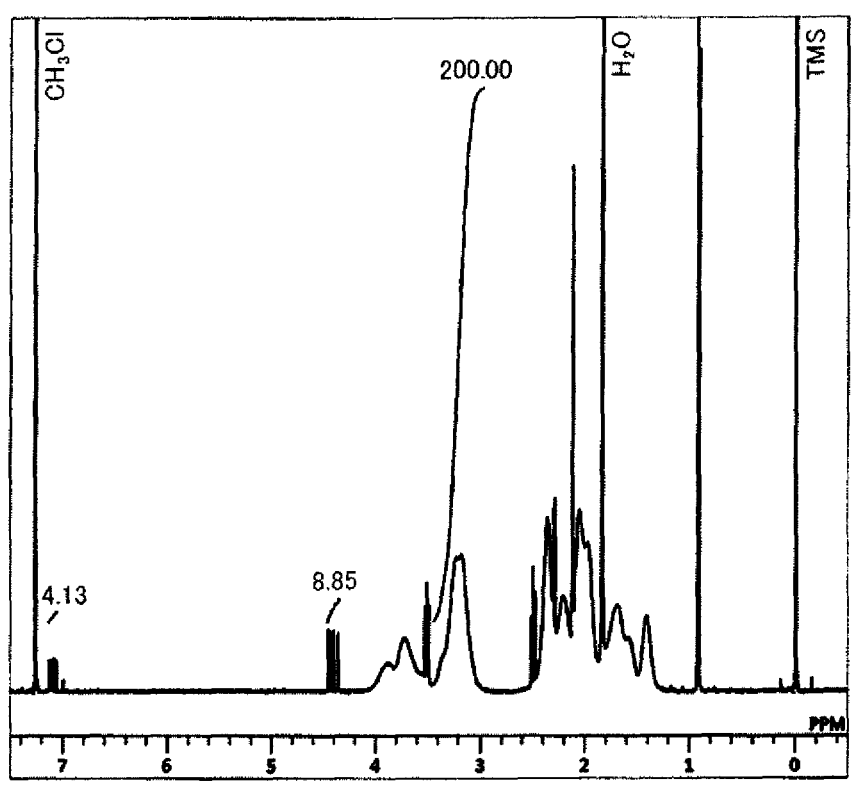

SILVER NANOWIRES AND METHOD FOR PRODUCING SAME, AND SILVER NANOWIRE INK AND TRANSPARENT CONDUCTIVE FILM

TECHNICAL FIELD

The present invention relates to metal nanowires that are useful as a material for forming a transparent conductive film, and the like and a method for producing the same. The invention also relates to an ink and a transparent conductive film that use the silver nanowires.

BACKGROUND ART

In the description herein, fine metal wires having a thickness of approximately 200 nm or less are referred to as "nanowires".

Silver nanowires are expected as a conductive material for imparting conductivity to a transparent substrate. By coating a liquid containing silver nanowires (i.e., a silver nanowire ink) on a transparent substrate, such as glass, PET (polyethylene terephthalate), and PC (polycarbonate), followed by removing the liquid component by evaporation or the like, the silver nanowires are in contact with each other on the substrate to form a conductive network, thereby achieving a transparent conductive film. For a transparent conductive material, a metal oxide film represented by ITO has been frequently used. However, a metal oxide film has defects including the high film forming cost, the low resistance to bending, which may prevent the final product from becoming flexible, and the like. A conductive film for a touch-sensitive panel sensor, which is one of the major applications of a transparent conductive film, is demanded to have high transparency and high conductivity, and the demand invisibility thereof is also increasing in recent years. An ordinary ITO film necessarily has an increased thickness of the ITO layer for enhancing the conductivity thereof, but the increase of the thickness may decrease the transparency, and the visibility may not be improved.

Silver nanowires are expected to avoid the aforementioned defects peculiar to a metal oxide film represented by ITO, and have been put to practical use as a material of the transparent conductive film.

Examples of the known synthesis method of silver nanowires used for a conductor of a transparent conductive film include a method of dissolving a silver compound in a polyol solvent, such as ethylene glycol, and depositing metallic silver having a linear shape by utilizing the reduction power of the polyol as the solvent, in the presence of a halogen compound, and PVP (polyvinylpyrrolidone) or a copolymer of vinylpyrrolidone and another monomer, as an organic protective agent (PTLs 1 and 2).

CITATION LIST

Patent Literatures

PTL 1: JP-A-2014-224199
PTL 2: JP-A-2015-180772

SUMMARY OF INVENTION

Technical Problem

A silver nanowire ink generally contains an alcohol, such as ethyl alcohol, isopropyl alcohol, and n-butyl alcohol, or a polyol, such as ethylene glycol, for improving the wettability to a PET film or a PC film to be a substrate of a transparent conductive film. The ordinary silver nanowires synthesized by using PVP as an organic protective agent as described in PTL 1 are covered with PVP on the surface of the wires. In the case where an alcohol is added to the ink for improving the wettability to a substrate, it is difficult to provide a silver nanowire ink having good dispersion stability due to the extremely high hydrophilicity of PVP. Specifically, the silver nanowires covered with PVP in the form of an ink tend to cause aggregation and sedimentation. According to the technique described in PTL 2, on the other hand, the dispersion stability of the wires in the silver nanowire ink containing an alcohol can be improved by using a copolymer of vinylpyrrolidone and another monomer as an organic protective agent.

For silver nanowires used as a conductor for a transparent conductive film, it has been known that the thinner the diameter thereof is, the better the visibility (e.g., low haze and high translucency) of the transparent conductive film is, and the longer the length of the silver nanowire is, the better the conductivity of the transparent conductive film is. Synthesized silver nanowires can be recovered as silver nanowire having an increased proportion of thin and long wires (i.e., wires having high usefulness) by subjecting to a purification operation for removing unuseful products, such as short wires, rod-like products, and particulate products. However, in the case where the amount of the unuseful products to be removed is large, not only the yield rate is deteriorated, but also the purification operation becomes complicated and requires a prolonged period of time, resulting in considerable deterioration of the productivity. It may be effective for the enhancement of the yield rate and the productivity that a reduction synthesis method producing a less amount of the unuseful products is adopted in the stage of reduction deposition. The technique described in PTL 2 can provide thin and long wires relatively efficiently. However, it is considered that further thinner and longer silver nanowires may be demanded in the future. It is demanded to establish a technique capable of performing stable reduction synthesis of the thinner and longer wires.

In the case where the silver nanowires covered with an organic protective agent contains a large amount of impurities, the impurities may be a factor deteriorating the characteristics (e.g., the conductivity and the low haze property) of the transparent conductive film, and it is also considered that chemical change occurs in some use environments, and the reaction products deteriorate the appearance and the capability of the device.

An object of the invention is to provide a technique capable of stably achieving thin and long silver nanowires covered with an organic protective agent containing a less amount of impurities, the silver nanowires having good dispersibility in an ink having an alcohol added thereto. Another object of the invention is to provide a transparent conductive film having high conductivity and less haze, by utilizing the technique.

Solution to Problem

As a result of the detailed investigations by the present inventors, it has been found that the use of a vinylpyrrolidone copolymer composition having a small sulfur content and a small content of the residual vinylpyrrolidone monomer as an organic protective agent is significantly effective for the stable reduction synthesis of thin and long silver nanowires.

For achieving the aforementioned objects, the following inventions are described herein.

[1] Silver nanowires containing covered thereon a copolymer composition containing one or more kinds of a copolymer having a vinylpyrrolidone structural unit, and having a sulfur content Sppm of 2,000 ppm or less and a residual vinylpyrrolidone monomer content ratio $VP_R$ defined by the following expression (1) of 6.0% or less, the silver nanowires having an average diameter of 30 nm or less and an average length of 10 μm or more:

$$VP_R(\%) = (2 \times (A+B)/(3 \times C)) \times 100 \quad (1)$$

wherein A represents an integrated value of a peak (7.0 to 7.2 ppm) derived from methine protons of a C=C double bond of the vinylpyrrolidone monomer in an NMR spectrum of the copolymer composition; B represents an integrated value of a peak (4.3 to 4.4 ppm) derived from methylene protons of a C=C double bond of the vinylpyrrolidone monomer in the spectrum; and C represents an integrated value of a peak (3.0 to 3.4 ppm) derived from methylene protons adjacent to a N atom of the copolymer in the spectrum.

[2] The silver nanowires according to the item [1], wherein the copolymer composition has a weight average molecular weight Mw of the copolymer of from 30,000 to 300,000.

[3] The silver nanowires according to the item [1] or [2], wherein the copolymer composition has a ratio Sppm/Mw of the sulfur content Sppm (ppm) and a weight average molecular weight Mw of the copolymer of 0.040 or less.

[4] The silver nanowires according to any one of the items [1] to [3], wherein one or more kinds of the copolymer constituting the copolymer composition each have a polymerization composition with vinylpyrrolidone and one kind or two or more kinds of a monomer selected from a diallyldimethylammonium salt, ethyl acrylate, 2-hydroxyethyl acrylate, 2-hydroxyethyl methacrylate, 4-hydroxybutyl acrylate, N-methylmaleimide, N-ethylmaleimide, N-propylmaleimide, and N-tert-butylmaleimide.

[5] A silver nanowire ink containing a liquid medium and therein the silver nanowires according to any one of the items [1] to [4] in an amount of from 0.02 to 5.0% by mass in terms of mass ratio of metallic silver.

[6] A transparent conductive film containing the silver nanowires according to any one of the items [1] to [4] in a presence density of from 5 to 500 mg/m² in terms of mass of metallic silver.

[7] The transparent conductive film according to the item [6], wherein the transparent conductive film has a surface resistance of 200 Ω/sq or less and a haze of 2.0% or less.

[8] A method for producing silver nanowires, including reduction-depositing silver into a wire form in an alcohol solvent having dissolved therein a silver compound and an organic protective agent, the organic protective agent being a copolymer composition containing one or more kinds of a copolymer having a vinylpyrrolidone structural unit, and having a sulfur content Sppm of 2,000 ppm or less and a residual vinylpyrrolidone monomer content ratio $VP_R$ defined by the following expression (1) of 6.0% or less, the silver nanowires having an average diameter of 30 nm or less and an average length of 10 μm or more:

$$VP_R(\%) = (2 \times (A+B)/(3 \times C)) \times 100 \quad (1)$$

wherein A represents an integrated value of a peak (7.0 to 7.2 ppm) derived from methine protons of a C=C double bond of the vinylpyrrolidone monomer in an NMR spectrum of the copolymer composition; B represents an integrated value of a peak (4.3 to 4.4 ppm) derived from methylene protons of a C=C double bond of the vinylpyrrolidone monomer in the spectrum; and C represents an integrated value of a peak (3.0 to 3.4 ppm) derived from methylene protons adjacent to a N atom of the copolymer in the spectrum.

[9] The method for producing silver nanowires according to the item [8], wherein the copolymer composition has a weight average molecular weight Mw of the copolymer of from 30,000 to 300,000.

[10] The method for producing silver nanowires according to the item [8] or [9], wherein the copolymer composition has a ratio Sppm/Mw of the sulfur content Sppm (ppm) and a weight average molecular weight Mw of the copolymer of 0.040 or less.

[11] The method for producing silver nanowires according to any one of the items [8] to [10], wherein one or more kinds of the copolymer constituting the copolymer composition each have a polymerization composition with vinylpyrrolidone and one kind or two or more kinds of a monomer selected from a diallyldimethylammonium salt, ethyl acrylate, 2-hydroxyethyl acrylate, 2-hydroxyethyl methacrylate, 4-hydroxybutyl acrylate, N-methylmaleimide, N-ethylmaleimide, N-propylmaleimide, and N-tert-butylmaleimide.

The "copolymer composition" referred in the description herein contains one kind or two or more kinds of a copolymer and impurities that are incorporated therein along with the copolymer in the synthesis process of the copolymer. Sulfur and the residual vinylpyrrolidone monomer correspond to the impurities. Impurities other than sulfur and the residual vinylpyrrolidone monomer are not dealt in the invention.

Assuming that the ratio of the average length (nm) and the average diameter (nm) of the silver nanowires is referred to as an average aspect ratio, the average aspect ratio is preferably 450 or more. The average diameter, the average length, and the average aspect ratio are in accordance with the following definitions.

Average Diameter

On a micrograph (such as an FE-SEM micrograph), the average width between the contours on both sides in the thickness direction of one silver nanowire is designated as the diameter of the wire. The value obtained by averaging the diameters of the respective silver nanowires present on the micrograph is designated as the average diameter. For calculating the average diameter, the total number of the wires to be measured is 100 or more.

Average Length

On a micrograph (such as an FE-SEM micrograph), the trace length from one end to the other end of one silver nanowire is designated as the length of the wire. The value obtained by averaging the lengths of the respective silver nanowires present on the micrograph is designated as the average length. For calculating the average length, the total number of the wires to be measured is 100 or more.

The silver nanowires according to the invention are constituted by wires each having an extremely long and thin shape. Accordingly, the recovered silver nanowires each often have a curved string shape rather than a straight rod shape. The lengths of the curved silver nanowires can be measured efficiently by utilizing an image processing software.

Average Aspect Ratio

The average aspect ratio is calculated by substituting the average diameter and the average length for the following expression (2).

$$(\text{average aspect ratio}) = (\text{average length (nm)})/(\text{average diameter (nm)}) \quad (2)$$

The copolymer composition preferably has a weight average molecular weight Mw of the copolymer of from 30,000 to 300,000. The weight average molecular weight Mw of the copolymer can be obtained by GPC (gel permeation chromatography). Assuming that the molecular weights of the elution positions on the GPC curve obtained through the molecular weight calibration curve are designated as Mi, and the number of the molecules is Ni, the weight average molecular weight Mw of the copolymer corresponds to the value calculated by the following expression (3).

$$Mw=\Sigma(Mi^2 \times Ni)/\Sigma(Mi \times Ni) \quad (3)$$

The silver nanowires may be dispersed in a liquid medium to form a silver nanowire ink for forming a transparent conductive film. The silver nanowire content in the liquid medium is preferably from 0.02 to 5.0% by mass in terms of mass ratio of metallic silver. A transparent conductive film containing the silver nanowires in a presence density of from 5 to 500 mg/m$^2$ in terms of mass of metallic silver is also provided. The transparent conductive film that has a surface resistance of 200 Ω/sq or less and a haze of 2.0% or less may be a particularly preferred target.

The silver nanowires can be produced by a method for producing silver nanowires, including reduction-depositing silver into a wire form in an alcohol solvent having dissolved therein a silver compound and an organic protective agent. A method is described herein, in which in the reduction-depositing step, the organic protective agent used is a copolymer composition containing one or more kinds of a copolymer having a vinylpyrrolidone structural unit, and having a sulfur content Sppm of 2,000 ppm or less and a residual vinylpyrrolidone monomer content ratio VP$_R$ defined by the above described expression (1) of 6.0% or less. The silver nanowires thus reduction-deposited may be recovered as metal nanowires suitable for forming an ink, through an intermediate process, such as cleaning and purification. The intermediate process may slightly decrease the sulfur content and the residual monomer content in the organic protective layer covering the surface of metallic silver in some cases. However, for stably achieving the metal nanowire used having a covering substance having a sulfur content Sppm of 2,000 ppm or less and a residual vinylpyrrolidone monomer content ratio VP$_R$ of 6.0% or less, it is significantly effective to use the copolymer composition having a sulfur content Sppm of 2,000 ppm or less and a residual vinylpyrrolidone monomer content ratio VP$_R$ of 6.0% or less, as an organic protective agent in the stage of reduction deposition. In this case also, it is more preferred that the weight average molecular weight Mw of the copolymer is from 30,000 to 300,000, and the ratio Sppm/Mw of the sulfur content Sppm (ppm) and a weight average molecular weight Mw of the copolymer is 0.040 or less. Examples of the preferred counterpart monomer (i.e., a hydrophilic monomer other than vinylpyrrolidone) for forming a polymerization composition with vinylpyrrolidone include those described above.

Advantageous Effects of Invention

The silver nanowires according to the invention have the following advantages.

(1) The silver nanowires are covered with the copolymer having a polymerization composition with vinylpyrrolidone and a hydrophilic monomer other than vinylpyrrolidone, and thus are excellent in dispersibility of wires in a silver nanowire ink containing an alcohol or the like added thereto for improving the wettability to a substrate, such as a PET film and a PC film, as compared to silver nanowires covered with PVP.

(2) The silver nanowires are constituted by extremely thin and long wires having an average diameter of 30 nm or less and an average length of 10 µm or more, and thus the use thereof as a conductor of a transparent conductive film achieves a transparent conductive film that is excellent in visibility with a less haze while retaining a high conductivity.

(3) The copolymer composition covering the surface has a small sulfur content, and thus is enhanced in reaction resistance against a substance attached to the transparent conductive film during the use of the device and a substance in the air, and thereby the time degradation of the transparent conductive film and the adverse effects on the device due to the reaction product can be relieved. Sulfur in the copolymer composition is derived mainly from the sulfur component contained in the chain transfer agent (RAFT agent) for promoting living radical polymerization in the synthesis of the copolymer. PVP essentially has a small sulfur content, but is inferior in wire dispersibility in a silver nanowire ink containing an alcohol compound added thereto.

BRIEF DESCRIPTION OF DRAWINGS

FIG. 1 is a cross sectional view schematically showing a cross sectional structure of a flow channel portion including a crossflow filter using a porous ceramic tube.

FIG. 2 is an illustration schematically showing a concept of purification by crossflow filtration using a porous ceramic filter.

FIG. 3 is an illustration schematically showing an example of a tubular channel structure for purification of silver nanowires.

FIG. 4 is the FE-SEM micrograph of the specimen collected from the dispersion liquid after cleaning (before the crossflow purification) in Example 1.

FIG. 5 is the FE-SEM micrograph of the specimen collected from the dispersion liquid after cleaning (before the crossflow purification) in Comparative Example 1.

FIG. 6 is the FE-SEM micrograph of the specimen collected from the dispersion liquid after cleaning (before the crossflow purification) in Comparative Example 2.

FIG. 7 is a structural formula of a vinylpyrrolidone structural unit.

FIG. 8 is a structural formula of vinylpyrrolidone (monomer).

FIG. 9 is an example of an NMR spectrum measured for a copolymer composition constituted by a copolymer having a vinylpyrrolidone structural unit.

DESCRIPTION OF EMBODIMENTS

Dimension and Shape of Silver Nanowires

The silver nanowires preferably have a shape that is thin and long as much as possible from the standpoint of the formation of a transparent conductive coated film having excellent conductivity and visibility. The silver nanowires having an average diameter of 30 nm or less and an average length of 10 µm or more are targeted herein. The average aspect ratio is preferably 450 or more. The average length can be enhanced by removing short wires by a purification operation. On the other hand, the average diameter is almost determined by whether or not thin wires can be stably synthesized in the reduction deposition reaction. In other words, it is difficult to control the average diameter afterward unless thin wires are synthesized. The use of the copolymer composition described later as an organic protective agent enables the reduction deposition of significantly thin silver nanowires having an average diameter of 30 nm or less.

Copolymer Composition

As the organic protective agent covering the metallic silver surface of the silver nanowire, a copolymer composition constituted by one or more kinds of a copolymer having a vinylpyrrolidone structural unit is used. FIG. 7 shows a structural formula of a vinylpyrrolidone structural unit. PVP (polyvinylpyrrolidone), which is a homopolymer, has been used as an organic protective agent suitable for the synthesis of practical silver nanowires. As described above, however, there is a disadvantage that the wire dispersibility is deteriorated in a liquid medium containing an alcohol compound for improving the wettability to a substrate, such as PET. As a result of the various investigations by the inventors, it has been found that the use of a copolymer of vinylpyrrolidone and a monomer other than vinylpyrrolidone can improve the dispersibility in a liquid medium containing an alcohol compound. It has further confirmed that silver nanowires having a thin and long practical shape can be obtained even with the copolymer.

In recent years, there are increasing needs of the further improvement of the conductivity and the low haze property of a transparent conductor. For achieving the enhancement of the conductivity and the enhancement of the low haze property simultaneously, it is particularly effective that the shape of the silver nanowires used as the conductor is made thinner to increase the aspect ratio. As a result of the earnest investigations by the inventors, it has been newly found that the use of a copolymer composition having a small sulfur content and a small residual vinylpyrrolidone content as the organic protective agent enables the stable synthesis of significantly thin silver nanowires. Furthermore, the length thereof can be sufficiently ensured to enhance the aspect ratio.

Sulfur Content Sppm

The method for synthesizing the copolymer used as the organic protective agent of the silver nanowires is preferably living radical polymerization, by which the molecular weight can be precisely controlled, and the molecular weight distribution can be narrow. The molecular weight distribution tends to be broad by general radical polymerization, which is disadvantageous for controlling the shape of the silver nanowires to be reduction-deposited. Examples of the living radical polymerization method include reversible addition-fragmentation chain transfer polymerization (RAFT method) and atom transfer radical polymerization (ATRP method), and the RAFT method is preferred from the standpoint of the non-use of a transition metal catalyst, and the like. The sulfur component contained in the chain transfer agent (RAFT agent) for promoting the living radical polymerization tends to be incorporated into the synthesized copolymer product.

According to the investigations by the inventors, the use of an organic protective agent constituted by a copolymer having a vinylpyrrolidone structural unit having a sulfur content Sppm that is controlled to 2,000 ppm or less is significantly effective for providing thin wires. With a copolymer having a larger sulfur content than that, it is difficult to provide stably silver nanowires having an average diameter of 30 nm or less. The copolymer having Sppm of 1,500 ppm or less is more preferably used, and the copolymer having Sppm of 1,200 ppm or less is further preferred. In particular, when the weight average molecular weight Mw of the copolymer is smaller, Sppm is preferably restricted more severely. This is because there is a large tendency that a RAFT agent containing sulfur is attached finally to the ends of the copolymer, and the sulfur may be a factor inhibiting the reduction deposition of thin and long nanowires. Accordingly, even assuming that the sulfur content contained in the copolymer composition is constant, the smaller the weight average molecular weight Mw of the copolymer (i.e., the larger the number of molecules thereof) is, the larger the proportion of sulfur present at the ends of molecules (i.e., the proportion of sulfur becoming a factor inhibiting the reduction deposition of thin and long nanowires) is.

According to the results of the investigations, the copolymer having a ratio Sppm/Mw of the sulfur content Sppm (ppm) and the weight average molecular weight Mw of the copolymer of 0.040 or less is preferably applied, and the copolymer having the ratio of 0.030 or less is more preferred. The sulfur content Sppm is preferably as small as possible, but excessive decrease of the sulfur content may be a factor causing cost increase. The copolymer having Sppm in a range of 0.001 ppm or more may be used from the standpoint of the cost. The use of the copolymer having Sppm controlled to a range of 200 ppm or more is further effective for decreasing the cost.

The low sulfur content of the copolymer composition covering the silver nanowires is advantageous for relieving the time degradation of the transparent conductive film and the adverse effects on the device due to the reaction product. The copolymer composition forming the covering layer preferably has a sulfur content Sppm of 2,000 ppm or less, and more preferably 1,500 ppm or less, and may be managed to 1,200 ppm or less. In particular, the ratio Sppm/Mw of the sulfur content Sppm (ppm) and the weight average molecular weight Mw of the copolymer is further preferably 0.040 or less, and still further preferably 0.030 or less. It is considered that the sulfur content in the covering layer may be slightly decreased in the process of cleaning the reduction-synthesized silver nanowires and the process of purifying the silver nanowires. By restricting the sulfur content Sppm of the copolymer composition used in the reduction deposition to the aforementioned range, the sulfur content of the copolymer composition covering the silver nanowires can be managed to a sufficiently low value.

Residual Vinylpyrrolidone Monomer Content Ratio $VP_R$

In the synthesis of the copolymer from the raw material monomer, the unreacted raw material monomer that has not become the copolymer remains to some extent. According to the studies by the inventors, it has been found that the fact that the low content of the residual vinylpyrrolidone monomer among the residual monomers is significantly important for the synthesis of thin and long silver nanowires. As a result of the various investigations, the copolymer composition having a residual vinylpyrrolidone monomer content ratio $VP_R$ defined by the expression (1) of 6.0% or less is preferably used. When $VP_R$ is larger than that, the amount of metallic silver in the form of particulates or rods may be increased, and it may be difficult to provide efficiently silver nanowires having a high average aspect ratio. The copolymer having $VP_R$ of 5.0% or less is more preferably used, and the copolymer having $VP_R$ of 4.0% or less is further preferred. The residual vinylpyrrolidone monomer content ratio $VP_R$ is preferably as small as possible, but excessive decrease thereof may be a factor causing cost increase. The copolymer having $VP_R$ of 0.01% or more may be used from the standpoint of the cost. The use of the copolymer having VP$_R$ controlled to a range of 0.10% or more is further effective for decreasing the cost.

The low residual vinylpyrrolidone monomer content ratio of the copolymer composition covering the silver nanowires is advantageous for providing a silver nanowire ink excellent in storage stability (i.e., the property capable of retaining the dispersed state of the silver nanowire for a prolonged period of time). The copolymer composition forming the covering layer preferably has a residual vinylpyrrolidone monomer content ratio VP$_R$ of 6.0% or less, and more preferably 5.0% or less. It is considered that the sulfur content in the covering layer may be slightly decreased in the process of cleaning the reduction-synthesized silver nanowires and the process of purifying the silver nanowires. By restricting the residual vinylpyrrolidone monomer content ratio VP$_R$ of the copolymer composition used in the reduction deposition to the aforementioned range, the residual vinylpyrrolidone monomer content ratio of the copolymer composition covering the silver nanowires can be managed to a sufficiently low value.

Examples of Process for Decreasing Sulfur Content and Residual Vinylpyrrolidone Monomer Content Ratio The synthesized copolymer composition contains the chain transfer agent component containing sulfur and the residual vinylpyrrolidone monomer. For decreasing the sulfur content and the residual vinylpyrrolidone monomer content ratio in the copolymer composition, it is effective to subject the synthesized copolymer composition, for example, to the following cleaning treatment. The synthesized copolymer composition is dissolved in a chloroform solvent to provide a copolymer-containing liquid. In the chloroform solvent, the chain transfer agent component and the residual vinylpyrrolidone monomer are dissolved in addition to the copolymer. The liquid is added dropwise to a diethyl ether solvent, and the copolymer is precipitated in the diethyl ether solvent since the copolymer is insoluble in the diethyl ether solvent. On the other hand, the chain transfer agent component and the residual vinylpyrrolidone monomer are soluble in diethyl ether, and thus the most thereof remain dissolved in the liquid. However, a part thereof may accompany the precipitated copolymer. The solid component thus precipitated is recovered by filtration. The dried product of the recovered solid component is again dissolved in a fresh chloroform solvent, and the resulting solution is added dropwise to fresh diethyl ether to precipitate the copolymer, which is then recovered as a solid component. The sulfur content and the residual vinylpyrrolidone monomer content ratio in the copolymer composition can be decreased by the cleaning treatment repeating the dissolving and precipitating operations. The process of decreasing the sulfur content and the residual vinylpyrrolidone monomer content ratio in the copolymer composition in this manner is referred to as a "copolymer cleaning treatment" in the examples later.

Weight Average Molecular Weight Mw

The copolymer composition used as the organic protective agent preferably has a weight average molecular weight Mw of the copolymer in a range of from 30,000 to 300,000, and more preferably in a range of from 30,000 to 150,000. Mw is determined by the expression (3). In the case where one kind of the copolymer is used, the weight average molecular weight of the copolymer is used as Mw. When the weight average molecular weight Mw of the copolymer is too small, metallic silver in the form of particulates tends to form to decrease the yield of the silver nanowires. When Mw is too large, the diameter of the resulting silver nanowires tends to be large, which is disadvantageous for stably providing thin silver nanowires suitable for a transparent conductive material.

Monomer

One or more kinds of the copolymer constituting the copolymer composition each preferably have a polymerization composition with vinylpyrrolidone and a hydrophilic monomer other than vinylpyrrolidone. According to the constitution, the silver nanowires exhibiting excellent dispersibility in an aqueous solvent containing an alcohol compound for improving the wettability to a substrate, such as PET, can be obtained, which is advantageous for forming a transparent conductive film excellent in uniformity.

More specific examples thereof include a copolymer having a polymerization composition with vinylpyrrolidone and one kind or two or more kinds of a monomer selected from a diallyldimethylammonium salt, ethyl acrylate, 2-hydroxyethyl acrylate, 2-hydroxyethyl methacrylate, 4-hydroxybutyl acrylate, N-methylmaleimide, N-ethylmaleimide, N-propylmaleimide, and N-tert-butylmaleimide.

Polymerization Composition

The polymerization composition of the copolymer is preferably formed of from 0.1 to 10% by mass of the monomer other than vinylpyrrolidone and the balance of vinylpyrrolidone. The "polymerization composition" herein means a structure where monomers are copolymerized, and a copolymer having a vinylpyrrolidone unit structure is targeted herein.

Analysis Method of Sulfur

The sulfur content Sppm in the copolymer composition can be obtained by the ICP atomic emission spectroscopy (inductively coupled plasma atomic emission spectroscopy).

Measurement Method of Residual Vinylpyrrolidone Monomer Content Ratio

The residual vinylpyrrolidone monomer content ratio VP$_R$ in the copolymer composition can be obtained from an NMR spectrum measured by the nuclear magnetic resonance method (NMR) according to the following expression (1).

$$VP_R(\%) = (2 \times (A+B)/(3 \times C)) \times 100 \quad (1)$$

In the expression, A represents the integrated value of the peak (7.0 to 7.2 ppm) derived from methine protons of the C=C double bond of the vinylpyrrolidone monomer (FIG. 8) in the NMR spectrum of the copolymer composition; B represents the integrated value of the peak (4.3 to 4.4 ppm) derived from methylene protons of the C=C double bond of the vinylpyrrolidone monomer in the spectrum; and C represents the integrated value of the peak (3.0 to 3.4 ppm) derived from methylene protons adjacent to the N atom of the copolymer in the spectrum.

FIG. 9 shows an example of the NMR spectrum measured for the copolymer composition constituted by the copolymer having a vinylpyrrolidone structural unit measured with a $^1$H-NMR equipment, JNM-LA400 (400 MHz), produced by JEOL Ltd. In this case, the integrated value of the peak corresponding to A in the expression (1) is 4.13, the integrated value of the peak corresponding to B is 8.85, and the integrated value of the peak corresponding to C is 200.00. By substituting these values for the expression (1), the residual vinylpyrrolidone monomer content ratio VP$_R$ is obtained as $(2 \times (4.13+8.85)/(3 \times 200.00)) \times 100 = 4.33\%$.

Examples of Method for producing Silver Nanowires

Examples of the method for producing silver nanowires are shown below.

Nanowire Synthesizing Step

The silver nanowires are synthesized by a method of reduction-depositing silver into a wire form in an alcohol solvent having dissolved therein a silver compound and an organic protective agent. This method has been subjected to practical use as a synthesis method for silver nanowires. For example, the methods described in PTLs 1 and 2 may be used. In the invention, a copolymer composition containing one or more kinds of a copolymer having a vinylpyrrolidone structural unit, and having a sulfur content Sppm of 2,000 ppm or less and a residual vinylpyrrolidone monomer content ratio $VP_R$ defined by the expression (1) of 6.0% or less is used as the organic protective agent. It has not been known up to the present that the use of the copolymer composition having a content of impurities that is severely restricted enables the efficient synthesis of thin and long silver nanowires.

Cleaning Step

The slurry after completing the reaction of the synthesizing step is subjected to solid-liquid separation to recover the silver nanowires. The method of the solid-liquid separation applied may be decantation or centrifugal separation. In the decantation, the slurry may be concentrated by allowing to stand for from 1 to 2 weeks, or may be concentrated with increase of the sedimentation rate by adding one or more kinds of a liquid medium having small polarity, such as acetone, toluene, hexane, kerosene, to the slurry. In the centrifugal separation, the silver nanowires may be concentrated by subjecting the slurry after the reaction directly to a centrifugal separation machine. After concentrating, the supernatant is removed, and the solid content is recovered. The solid content is redispersed in a liquid medium having large polarity, such as water and an alcohol, and concentrated by such a method as decantation or centrifugal separation, then the supernatant is removed, and the solid content is recovered. The operation of redispersing, concentrating, and removing the supernatant is referred to as "cleaning". The cleaning is preferably performed repeatedly.

Purifying Step

The silver nanowires recovered in the cleaning step contain substances that are not useful as a conductor of a transparent conductive film, such as nanoparticles in the form of particulates and short nanowires. The process of removing the unuseful substances as much as possible to extract the thin and long silver nanowires is referred to as "purification". Examples of the relatively simple purification method include decantation. The silver nanowires after completing the cleaning step are dispersed in a liquid medium, then one or more kinds of a liquid medium having small polarity, such as acetone, toluene, hexane, kerosene, is added to the dispersion liquid, which is then allowed to stand, and thereby the long nanowires undergo sedimentation. The short nanowires and the nanoparticles have a small sedimentation rate and thus can be removed along with the supernatant. By repeating the decantation method, the amount of the unuseful substances contained in the recovered solid content is gradually decreased to achieve the purification. In the case where the cleaning step is performed by the decantation method, the operation thereof may be further repeated to perform the purification. The purification method utilizing decantation is hereinafter referred to as a "dispersion-sedimentation purification method".

The dispersion-sedimentation purification method is a simple method, but is inferior in productivity since a prolonged period of time is required for repeating the sedimentation. Furthermore, in the case where the silver nanowires are controlled to have a prescribed length distribution, it is difficult to control precisely. For avoiding the defects, purification by "crossflow filtration" is effective. Examples of the material for the filter used in the crossflow filtration generally include a nylon filter, a hollow fiber membrane filter, a, metallic filter, and a ceramic filter, and these may be used in the purifying step. However, in the case where the ordinary crossflow filtration is applied to the purification of silver nanowires, there may be a problem that the filter tends to clog. Furthermore, when the nylon filter, the hollow fiber membrane filter, the metallic filter, and the like once clog, the filters cannot be regenerated for reusing. The inventors have developed the crossflow filtration technique that is significantly effective for the purification of silver nanowires and have described in Japanese Patent Application No. 2015-173734. The crossflow filtration technique uses a tubular flow channel having a porous ceramic filter having an average pore diameter by the mercury intrusion method, for example, of 1.0 µm or more, on the wall surface of the flow channel. The purification of silver nanowires can be performed significantly efficiently by the technique.

The crossflow filtration technique described in Japanese Patent Application No. 2015-173734 is briefly described. FIG. 1 schematically exemplifies a cross sectional structure of a flow channel portion using a porous ceramic tube as a filter, as one embodiment of the crossflow filtration suitable for the purification of silver nanowires. One end of a porous ceramic tube 1 is connected to an upstream side flow channel tube 2, and the other end thereof is connected to a downstream side flow channel tube 3. Silver nanowires flowing along with a liquid medium in the direction of the arrow A in the upstream side flow channel tube 2 are introduced to the interior of the porous ceramic tube 1. The ceramics of the porous ceramic tube 1 have a porous structure having an average pore diameter of 1.0 µm or more, preferably more than 2.0 µm, and more preferably more than 5.0 µm, and a substance can migrate through the voids connected in the thickness direction. In the longitudinal length of the porous ceramic tube 1, the portion that functions as a filter is denoted by numeral 10 in the figure. In the portion 10 of the tubular flow channel, the silver nanowires proceed in the direction of the arrow B along with the flow of the liquid medium, and a part of the flowing silver nanowires pass through the tube wall of the porous ceramic tube 1 along with a part of the liquid medium, and discharged outside the tubular flow channel 10 as shown by the arrow C. The silver nanowires that are not discharged outside in the portion 10 of the tubular flow channel, but flow and proceed in the direction of the arrow D have an enhanced presence ratio of wires having a large length.

FIG. 2 schematically shows the concept of purification by crossflow filtration using the porous ceramic filter. In the figure, the interior of the tubular channel inside the inner wall surface of a porous ceramic filter 23 is denoted by numeral 32. The direction of the flow in the interior 32 of the tubular channel is shown by the arrow denoted by numeral 60. Through the pores 31 (which are actually continuous voids) of the porous ceramic filter, not only particulate impurities 61, but also relatively short nanowires 62 are discharged outside along with a part of the liquid medium. The liquid that is discharged outside is referred to as a "filtrate" and denoted by numeral 30. A part of the organic protective agent detached from the surface of the circulated silver nanowires is also discharged outside along with the liquid medium, and thus the circulated liquid is cleaned. The probability that wires 62 having a length that is significantly larger than the pore diameter are discharged outside through the pores 31 is extremely small. Consequently, the most of the long wires 62 proceed through the circulation flow channel on the flow inside the circulation tubular channel.

FIG. 3 schematically shows an example of the tubular channel structure for purification of silver nanowires. A silver nanowire dispersion liquid 26 before purification is prepared in a tank 21, and made to flow with power of a pump 22 in the crossflow filter 23 having a porous ceramic filter on the wall surface of the flow channel, at which the crossflow filtration is performed. The short wires are discharged outside a circulation channel 20 as the filtrate 30, and the silver nanowires that flow and proceed in the channel 20 without discharge are recovered. FIG. 3 exemplifies a "circulation system", in which the silver nanowires to be recovered are returned to the original tank, but the silver nanowires may be recovered to another tank to perform a batch system. Through the flow of the silver nanowires along with the liquid medium inside the circulation channel 20, the amount of the organic protective agent (i.e., the copolymer composition) covering the surface of the silver nanowires is gradually decreased. Accordingly, the crossflow filtration may also be utilized as a process for decreasing the attached amount of the organic protective agent. Numeral 27 denotes the liquid medium replenished during the circulation. A part of the liquid inside the circulation channel 20 is discharged as the filtrate 30 during the circulation, and therefore the liquid medium is necessarily replenished for retaining the liquid amount inside the circulation channel 20 to a prescribed range. In the case where the circulation is performed in a state where the replenished amount of the replenished liquid medium 27 per unit time is controlled to be smaller than the discharged amount of the filtrate 30 per unit time, or in a state where the replenishment of the liquid medium is terminated, the liquid amount inside the circulation channel 20 is gradually decreased. By utilizing the decrease of the amount of the circulated liquid, the "concentrating" of the silver nanowire dispersion liquid can be efficiently performed.

Any liquid feed pump can be used without particular limitation, as far as the pump can feed the liquid containing silver nanowires, and such a pump is preferably used that can prevent breakage of wires (such as rupture, folding, and entanglement) from occurring, and can feed at a relatively high pressure. Examples thereof include a hose pump, a tube pump, a rotary pump, a mono pump, a screw pump, a piston pump, a syringe pump, a plunger pump, and a heart pump.

The pressure of the liquid introduced to the interior of the tubular flow channel having the porous ceramic filter on the wall surface of the flow channel may be controlled, for example, to a range of from 0.01 to 0.5 MPa. The flow rate of the liquid introduced to the interior of the tubular flow channel having the porous ceramic filter on the wall surface of the flow channel may be controlled, for example, to a range of from 1 to 200 L/min at the upstream side end of the filter (which is the position denoted by numeral 11 in FIG. 1).

Examples of the liquid medium used in the crossflow filtration include water, methyl alcohol, ethyl alcohol, n-propyl alcohol, isopropyl alcohol, n-butyl alcohol, and mixed liquids thereof. It is effective for the enhancement of the dispersibility of the silver nanowires that the organic protective agent (i.e., the copolymer composition) for the silver nanowires or a water-soluble polymer, such as PVP, is added to the liquid medium in an amount of from 0.001 to 1% by mass. The concentration of the silver nanowires in the liquid medium inside the circulation channel 20 may be set, for example, to a range of from 0.005 to 3.0% by mass.

As a purification method other than the dispersion-sedimentation purification method and the crossflow purification, centrifugal separation may also be used. Two or more of these methods may be applied.

Conductive Transparent Film

The transparent conductive film can be formed by coating an ink having the silver nanowires dispersed therein (i.e., a silver nanowire ink) on a surface of a transparent substrate (such as PET), and then dried. In the case where the aforementioned silver nanowires having an average diameter of 30 nm or less and an average length of 10 μm or more are used as the conductor of the transparent conductive film, the silver nanowires are preferably present in the transparent conductive film in a presence density of from 5 to 500 mg/m$^2$ per unit area. When the presence density is too small, the conductivity may be decreased, and when the presence density is too large, the light transmittance may be decreased, and the haze may be increased. The surface resistance of the transparent conductive film is preferably 200 Ω/sq or less, and more preferably 100 Ω/sg or less. The haze thereof is preferably 2.0% or less, and more preferably 1.0% or less. The total light transmittance thereof is preferably 85% or more, and more preferably 90% or more. The use of the silver nanowires according to the invention enables the stable production of a transparent conductive film having a surface resistance of 60 Ω/sq or less and a haze of 1.0% or less, i.e., having conductivity and visibility, both of which are achieved at high levels simultaneously. The haze may be measured by a method that satisfies the definition of JIS K7136:2000 "Plastics, Determination of haze for transparent materials".

EXAMPLES

In Examples shown below, a copolymer powder as a row material was subjected to the aforementioned "copolymer cleaning treatment" to provide copolymer compositions A to G having been controlled for the sulfur content Sppm and the residual vinylpyrrolidone monomer content ratio $VP_R$. Copolymer compositions having various Sppm and $VP_R$ were obtained depending on the difference in Sppm and $VP_R$ of the raw material powder and the difference in the number of the operation of dissolution and precipitation in the copolymer cleaning treatment.

Example 1

Organic Protective Agent

A copolymer composition A constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate. The copolymer composition was measured for the sulfur content Sppm, the residual vinylpyrrolidone monomer content ratio $VP_R$, and the weight average molecular weight Mw, in the following manners.

Sulfur Content Sppm 0.2 g of the copolymer composition was weighed and placed in a 100 mL measuring flask along with water, to which 5 g of nitric acid having a concentration of 60% by mass was added, and water was added thereto to make 100 mL, followed by stirring, so as to provide a specimen. The specimen was measured with an ICP atomic emission spectrometer, 720-ES, produced by Agilent Technologies Inc., and the sulfur content Sppm was obtained from the resulting spectrum intensity. The measurement wavelength used was 181.972 nm.

Residual Vinylpyrrolidone Monomer Content Ratio $VP_R$

According to the aforementioned "Measurement Method of Residual Vinylpyrrolidone Monomer Content Ratio", the residual vinylpyrrolidone monomer content ratio $VP_R$ was obtained from the NMR spectrum according to the expression (1). The NMR spectrum was measured with a $^1$H-NMR equipment, JNM-LA400 (400 MHz), produced by JEOL Ltd.

Weight Average Molecular Weight Mw

The weight average molecular weight Mw of the copolymer was measured by measuring the molecular weight distribution thereof by the GPC-MALLS method under the following condition.

Equipment: HLC-8320GPC EcoSEC (produced by Tosoh Corporation)

Columns: TSKgel GMPWXL (×2)+G2500PWXL

Eluent: 100 mM sodium nitrate aqueous solution/acetonitrile=80/20

Flow rate: 1.0 mL/min

Temperature: 40° C.

Injection amount: 200 μL

Multiangle light scattering detector: DAWN HELEOS II (produced by Wyatt Technology Corporation)

Refractive index (RI) detector: Optilab T-rEX (produced by Wyatt Technology Corporation)

According to the results of the measurements, the copolymer composition A had a sulfur content Sppm of 1,100 ppm, a residual vinylpyrrolidone monomer content ratio $VP_R$ of 3.5%, and a weight average molecular weight Mw of 82,000. The ratio Sppm/Mw was 0.0134.

Synthesis of Nanowires

At ordinary temperature, 0.15 g of a propylene glycol solution containing 1% by mass of lithium chloride, 0.10 g of a propylene glycol solution containing 0.25% by mass of potassium bromide, 0.20 g of a propylene glycol solution containing 1% by mass of lithium hydroxide, 0.16 g of a propylene glycol solution containing 2% by mass of aluminum nitrate nonahydrate, and 0.26 g of an organic protective agent formed of the aforementioned copolymer composition were added to 20.0 g of propylene glycol, and were dissolved therein by stirring, so as to provide a solution A. In a separate vessel, 0.21 g of silver nitrate was added and dissolved in 6 g of propylene glycol to provide a solution B. The solution B had a silver nitrate concentration of 0.20 mol/L. The total amount of the solution A was heated from ordinary temperature to 90° C. with an oil bath under stirring with a stirrer coated with a fluorine resin at 300 rpm, and then the total amount of the solution B was added to the solution A over 1 minute. After completing the addition of the solution B, the reaction liquid was continuously stirred at 90° C. for 24 hours. Thereafter, the reaction liquid was cooled to ordinary temperature.

Cleaning

To the reaction liquid thus cooled to ordinary temperature, acetone was added in an amount 20 times the reaction liquid, and the mixture was stirred for 10 minutes and then allowed to stand for 24 hours. After standing, a concentrate and a supernatant were observed, and the supernatant was removed with a pipette to recover the concentrate. 160 g of pure water was added to the concentrate, the mixture was stirred for 12 hours, then acetone was added to the mixture in an amount of 20 times the mixture, and the mixture was stirred for 10 minutes and then allowed to stand for 24 hours. After standing, a concentrate and a supernatant were observed, and the supernatant was removed with a pipette to recover the concentrate. The operations of the dispersion in pure water, the addition of acetone, the standing, and the removal of the supernatant were repeated several times or more to complete cleaning, resulting a concentrate after cleaning. The concentrate was diluted with a PVP (polyvinylpyrrolidone) aqueous solution containing 0.5% by mass of PVP having a weight average molecular weight of 55,000 in pure water, so as to prepare a dispersion liquid containing both silver nanowires and silver nanoparticles in a silver concentration of 0.8% by mass. The operations were performed in a glass vessel coated with a fluorine resin. A fluorine resin coating has an effect that hydrophilic nanowires are prevented from being attached to the surface of the vessel to enhance the yield. The resulting dispersion liquid is referred to as a "dispersion liquid after cleaning".

FIG. 4 shows the FE-SEM micrograph of the specimen collected from the dispersion liquid after cleaning. It was understood that the amount of short wires and particulate products was considerably small even in the stage before performing the purification described later. This is the effect of the use of the copolymer composition having a small sulfur content and a small residual vinylpyrrolidone monomer content ratio, as the organic protective agent.

Crossflow Purification

The nanowire synthesis step and the cleaning step shown above were performed for 40 batches to provide 1,040 g in total of the "dispersion liquid after cleaning". The dispersion liquid was diluted with pure water to make a silver concentration of 0.08% by mass, so as to provide 7 kg of a silver nanowire dispersion liquid. The dispersion liquid was purified by subjecting to crossflow filtration with a circulation channel having the structure shown in FIG. 3. As a porous ceramic filter, one tubular filter having a length of 500 mm, an outer diameter of 12 mm, and an inner diameter of 9 mm, formed of porous ceramics having an average pore diameter by the mercury intrusion method of 5.8 μm was used. The dispersion liquid was circulated at a flow rate of the liquid introduced to the inlet of the filter of 12 L/min. The capacity of the circulation channel (except for the tank) was 1.7 L, and the pressure at the upstream side of the filter was 0.025 MPa. The dispersion liquid was circulated for 12 hours while replenishing pure water to the tank, so as to provide a silver nanowire dispersion liquid. The process of the synthesis, the cleaning, and the crossflow purification was performed 4 times, and thus 28 kg in total of a "dispersion liquid after replenishing purification".

Concentrating Purification 28 kg of the "dispersion liquid after replenishing purification" was placed in the tank of the circulation channel shown in FIG. 3. The dispersion liquid was circulated without replenishment of pure water, so as to concentrate the dispersion liquid by utilizing the phenomenon that the liquid amount was decreased through discharge of the "filtrate" from the porous ceramic filter. The dispersion liquid was concentrated and purified in this manner to make a number ratio of nanowires having a length of 5.0 μm or less of 10% or less as the target, so as to provide a concentrated silver nanowire dispersion liquid. The dispersion liquid is referred to as a "dispersion liquid after concentrating purification".

Dispersion after Concentrating Purification

The dispersion liquid after concentrating purification thus obtained in the aforementioned manner had a silver concentration of 0.4% by mass. A specimen collected from the dispersion liquid was measured for the shape of the silver nanowires based on an SEM micrograph thereof (magnification for measuring length: 2,500, magnification for measuring diameter: 150,000). The image processing software used was Doctor Canvas, produced by Plussoft Corporation. As a result, the silver nanowires had an average length of 18.5 μm, an average diameter of 25.5 nm, and an average aspect ratio was 18,500 (nm)/25.5 (nm)≈725. The yield of the silver nanowires according to the following expression (4) was 34.0%.

Yield (%)=(total mass of silver in dispersion liquid after concentrating purification (g)/(total mass of silver charged at start of reduction reaction (g))×100 (4)

Production of Transparent Conductive Film

To the solid content recovered from the dispersion liquid after concentrating purification, a solvent containing pure water and isopropyl alcohol at a mass ratio of 9/1 was added, and 0.3% by mass of hydroxypropyl methyl cellulose as a thickener was added, so as to provide a silver nanowire ink. The content of the silver nanowires in the ink was controlled to 0.15% by mass. The silver nanowire ink was coated on a surface of a substrate formed of a PET film (Lumirror UD48, produced by Toray Industries, Inc., thickness: 100 μm, transmittance: 91.7%, haze: 1.5%) having a size of 10 cm×5 cm with a bar coater with a spiral wire No. 3 to 20, so as to provide coated films having various thicknesses. The number of the spiral wire of the bar coater corresponds to the wire diameter of the spiral wire (unit: mil, 1 mil=25.4 μm), and in general, the larger the number of spiral wire used is, the larger the thickness of the resulting coated film is. The coated films were dried at 120° C. for 1 minute. The dried coated films were measured for the surface resistance (sheet resistance) with Loresta GP MCP-T610 with an ESP probe, produced by Mitsubishi Chemical Analytech Co., Ltd. The dried coated films were measured for the total light transmittance with Hazemeter NDH 5000, produced by Nippon Denshoku Industries Co., Ltd. For avoiding the influence of the PET substrate from the values of the total light transmittance and the haze, the value obtained by (total light transmittance including substrate)+(100%−(transmittance of only substrate)) was used for the total light transmittance, and the value obtained by (haze including substrate)−(haze of only substrate) was used for the haze. As a result of the measurement, the transparent conductive film having a surface resistance (sheet resistance) of 47 Ω/sq had a haze of 0.52% and a total light transmittance of 99.1%. Thus, a transparent conductive film excellent in both conductivity and visibility was obtained.

Comparative Example 1

A copolymer composition B constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate.

As a result of the measurement in the same manner as in Example 1, the copolymer composition B had a sulfur content Sppm of 2,350 ppm, a residual vinylpyrrolidone monomer content ratio $VP_R$ of 1.4%, and a weight average molecular weight Mw of 60,000. The ratio Sppm/Mw was 0.0392.

A "dispersion liquid after cleaning" was obtained by performing the process of the synthesis of nanowires and the cleaning in the same manner as in Example 1 except that the copolymer composition B was used as an organic protective agent.

FIG. 5 shows the FE-SEM micrograph of the specimen collected from the dispersion liquid after cleaning. It was understood that as compared to Example 1 (FIG. 4), short wires and rod-like products were present in a large amount. This difference is caused by the use of the copolymer composition having a large sulfur content as the organic protective agent.

In this example, a sufficient amount of a silver nanowire dispersion liquid was not obtained after the crossflow purification due to the small amount of long silver nanowires, and the evaluation of coated films was not able to perform.

Comparative Example 2

A copolymer composition C constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate.

As a result of the measurement in the same manner as in Example 1, the copolymer composition C had a sulfur content Sppm of 870 ppm, a residual vinylpyrrolidone monomer content ratio $VP_R$ of 10.7%, and a weight average molecular weight Mw of 110,000. The ratio Sppm/Mw was 0.0079.

A "dispersion liquid after cleaning" was obtained by performing the process of the synthesis of nanowires and the cleaning in the same manner as in Example 1 except that the copolymer composition C was used as an organic protective agent.

FIG. 6 shows the FE-SEM micrograph of the specimen collected from the dispersion liquid after cleaning. It was understood that as compared to Example 1 (FIG. 4), rod-like products and particulate products were present in a large amount. This difference is caused by the use of the copolymer composition having a large residual vinylpyrrolidone monomer content ratio as the organic protective agent.

In this example, a sufficient amount of a silver nanowire dispersion liquid was not obtained after the crossflow purification due to the small amount of long silver nanowires, and the evaluation of coated films was not able to perform.

Example 2

A copolymer composition D constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate.

As a result of the measurement in the same manner as in Example 1, the copolymer composition D had a sulfur content Sppm of 319 ppm, a residual vinylpyrrolidone monomer content ratio $VP_R$ of 0.3%, and a weight average molecular weight Mw of 81,744. The ratio Sppm/Mw was 0.0039.

Synthesis of Silver Nanowires

At ordinary temperature, 0.484 g of lithium chloride, 0.1037 g of potassium bromide, 0.426 g of lithium hydroxide, and 4.994 g of a propylene glycol solution containing 20% by mass of aluminum nitrate nonahydrate, and 83.875 g of the copolymer of vinylpyrrolidone and diallyldimethylammonium nitrate were added to 7,900 g of propylene glycol, and were dissolved therein, so as to provide a solution A. In a separate vessel, 67.96 g of silver nitrate was dissolved in 320 g of propylene glycol by stirring at room temperature, so as to provide a solution B containing a silver.

The solution A was placed in a reaction vessel and heated from ordinary temperature to 90° C. under stirring at a rotation number of 175 rpm, and then the total amount of solution B was added to the solution A over 1 minute. After completing the addition of the solution B, the reaction liquid was continuously stirred at 90° C. for 24 hours. Thereafter, the reaction liquid was cooled to ordinary temperature to synthesize silver nanowires.

Cleaning

A 1 L portion was collected from the aforementioned reaction liquid (i.e., the liquid containing the synthesized silver nanowires) having been cooled to ordinary temperature, and transferred to a tank having a capacity of 35 L coated with PFA. Thereafter, 20 kg of acetone was added thereto, and the mixture was stirred for 15 minutes, and then allowed to stand for 24 hours to perform spontaneous sedimentation of the concentrate. Thereafter, the supernatant was removed, and the concentrate was recovered. To the resulting concentrate, 20 g of a PVP aqueous solution having dissolved therein PVP having a weight average molecular weight of 55,000 in an amount of 2% by mass was added, and the mixture was stirred for 3 hours to redisperse the silver nanowires. 2 kg of acetone was added to the redispersed silver nanowire dispersion liquid, and the mixture was stirred for 10 minutes, and then allowed to stand to perform spontaneous sedimentation of the concentrate. Thereafter, the supernatant was removed for the second time to provide a concentrate. 160 g of pure water was added to the resulting concentrate to redisperse the silver nanowires. 2 kg of acetone was added to the redispersed silver nanowire dispersion liquid, and the mixture was stirred for 30 minutes, and then allowed to stand to perform spontaneous sedimentation of the concentrate. Thereafter, the supernatant was removed for the third time to provide a concentrate. 320 g of a 0.5% by mass PVP aqueous solution having a weight average molecular weight of 55,000 was added to the resulting concentrate, followed by stirring for 12 hours, to provide a "dispersion liquid after cleaning".

Crossflow Filtration

The dispersion liquid after cleaning was diluted with pure water to provide a silver nanowire dispersion liquid having a silver nanowire concentration of 0.07% by mass. The dispersion liquid was subjected to crossflow filtration by using a tube of a porous ceramic filter. The ceramic filter used herein had an average pore diameter of 5.9 µm.

Specifically, by setting the liquid amount of the entire circulation system including the silver nanowire dispersion liquid to 52 L, and setting the flow rate of the liquid to 150 L/min, the dispersion liquid was circulated for 12 hours while replenishing pure water to the tank in an equivalent amount to the liquid amount discharged as a filtrate, so as to provide a "dispersion liquid after replenishing purification". Subsequently, the crossflow filtration was continued for 12 hours in the state that the replenishment of pure water was terminated, so as to concentrate the silver nanowire dispersion liquid by utilizing the phenomenon that the liquid amount was decreased through discharge of the filtrate. Thus, a "dispersion liquid after concentrating purification" was obtained.

A small amount of a specimen was collected from the dispersion liquid after concentrating purification, and after evaporating water as the dispersion liquid on an observation table, was observed with a high-resolution FE-SEM (high-resolution field emission scanning microscope), resulting in that the silver nanowires had an average length of 17.2 µm, an average diameter of 27.0 nm, and an average aspect ratio of 17,200/27.0≈637. The yield of the silver nanowires according to the expression (4) was 41.9%.

Formation of Ink

HPMC (hydroxypropyl methyl cellulose, produced by Shin-Etsu Chemical Co., Ltd.) was prepared as a thickener. Powder of HPMC was added to hot water strongly stirred with a stirrer, and then the mixture was spontaneously cooled to 40° C. while continuing the strong stirring, and then cooled to 10° C. or less with a chiller. The liquid after stirring was filtered with a metallic mesh having an aperture of 100 µm to remove gelled insoluble components, thereby providing an aqueous solution having HPMC dissolved therein.

2-Propanol (isopropyl alcohol) was prepared as an alcohol for adding to provide a mixed solvent of water and an alcohol. Resamine D-4090, produced by Dainichiseika Color & Chemicals Mfg. Co., Ltd. was prepared as a urethane resin.

In one vessel with a lid, 1.2 g of the silver nanowire dispersion liquid (containing water as a medium) obtained by the aforementioned crossflow filtration, 2.1 g of pure water, 0.2 g of the HPMC aqueous solution, 0.4 g of 2-propanol, and 0.1 g of the urethane resin were serially placed, and mixed by stirring in such a manner that the lid was closed, and the vessel was shaken 100 times every time the substances each were added to the silver nanowire dispersion liquid, so as to provide a silver nanowire ink. The contents of the substances in the ink (i.e., the ink composition) in terms of percentage by mass were 10.0% for 2-propanol, 0.15% for silver, 0.133% for the thickener (HPMC), and 0.10% for the binder component (urethane resin), with the balance of water. The organic protective agent was attached to the surface of the silver nanowire, but was able to ignore since the content of the organic protective agent occupied in the ink was a slight amount as compared to the other components.

Production of Transparent Conductive Film

A PET film substrate (Cosmoshine (trade name) A4100, produced by Toyobo Co., Ltd., transmittance: 90.2%, haze: 0.6%) having a thickness of 100 µm and a size of 50 mm×150 mm was prepared. The silver nanowire ink was coated on the bare surface of the PET film substrate having no readily adhesive layer formed thereon with a bar coater with a spiral wire No. 4 to 12, so as to provide coated films having various thicknesses. The coated films were dried at 120° C. in the air for 1 minute. The dried coated films were measured for the sheet resistance with Loresta GP MCP-T610, produced by Mitsubishi Chemical Analytech Co., Ltd. The dried coated films were measured for the total light transmittance with Hazemeter NDH 5000, produced by Nippon Denshoku Industries Co., Ltd. For avoiding the influence of the PET substrate from the values of the total light transmittance and the haze, the value obtained by (total light transmittance including substrate) (100%−(transmittance of only substrate)) was used for the total light transmittance, and the value obtained by (haze including substrate)−(haze of only substrate) was used for the haze. As a result of the measurement, the transparent conductive film having a surface resistance (sheet resistance) of 51 Ω/sq had a haze of 0.57% and a total light transmittance of 99.6%.

Example 3

A copolymer composition E constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate.

As a result of the measurement in the same manner as in Example 1, the copolymer composition E had a sulfur content Sppm of 484 ppm, a residual vinylpyrrolidone monomer content ratio $VP_R$ of 0.5%, and a weight average molecular weight Mw of 92,000. The ratio Sppm/Mw was 0.0053.

Synthesis of Silver Nanowires

At ordinary temperature, 4.84 g of a propylene glycol solution containing 10% by mass of lithium chloride, 0.1037 g of potassium bromide, 0.426 g of lithium hydroxide, 4.994 g of a propylene glycol solution containing 20% by mass of aluminum nitrate nonahydrate, and 83.875 g of the copolymer of vinylpyrrolidone and diallyldimethylammonium nitrate were added to 8,116.3 g of propylene glycol, and were dissolved therein, so as to provide a solution A. In a separate vessel, 67.96 g of silver nitrate was dissolved in a mixed solution of 95.70 g of propylene glycol and 8.00 g of pure water by stirring at 35° C., so as to provide a solution B.

The solution A was placed in a reaction vessel and heated from ordinary temperature to 90° C. under stirring at a rotation number of 175 rpm, and then the total amount of B was added to the solution A from two addition ports over 1 minute. After completing the addition of the solution B, the reaction liquid was continuously stirred at 90° C. for 24 hours. Thereafter, the reaction liquid was cooled to ordinary temperature to synthesize silver nanowires.

Cleaning

A "dispersion liquid after cleaning" was obtained in the same manner as in Example 2.

Crossflow Filtration

The crossflow filtration and the concentrating purification of the silver nanowire dispersion liquid were performed by using a tube of a porous ceramic filter in the same manner as in Example 2, so as to provide a "dispersion liquid after concentrating purification".

A small amount of a specimen was collected from the dispersion liquid after concentrating purification, and after evaporating water as the dispersion liquid on an observation table, was observed with a high-resolution FE-SEM (high-resolution field emission scanning microscope), resulting in that the silver nanowires had an average length of 19.0 μm, an average diameter of 26.8 nm, and an average aspect ratio of 19,000/26.8≈709. The yield of the silver nanowires according to the expression (4) was 51.1%.

Formation of Ink

An ink was formed in the same manner as in Example 2.

Production of Transparent Conductive Film

A transparent conductive film was produced and measured for the characteristics in the same manner as in Example 2. As a result of the measurement, the transparent conductive film having a surface resistance (sheet resistance) of 54 Ω/sq had a haze of 0.62% and a total light transmittance of 99.5%.

Example 4

A copolymer composition F constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate.

As a result of the measurement in the same manner as in Example 1, the copolymer composition F had a sulfur content Sppm of 592 ppm, a residual vinylpyrrolidone monomer content ratio $VP_R$ of 0.2%, and a weight average molecular weight Mw of 83,000. The ratio Sppm/Mw was 0.0071.

Synthesis of Silver Nanowires

Silver nanowires were synthesized in the same manner as in Example 3.

Cleaning

A "dispersion liquid after cleaning" was obtained in the same manner as in Example 2.

Crossflow Filtration

The crossflow filtration and the concentrating purification of the silver nanowire dispersion liquid were performed by using a tube of a porous ceramic filter in the same manner as in Example 2, so as to provide a "dispersion liquid after concentrating purification".

A small amount of a specimen was collected from the dispersion liquid after concentrating purification, and after evaporating water as the dispersion liquid on an observation table, was observed with a high-resolution FE-SEM (high-resolution field emission scanning microscope), resulting in that the silver nanowires had an average length of 18.4 μm, an average diameter of 26.8 nm, and an average aspect ratio of 18,400/26.8≈687. The yield of the silver nanowires according to the expression (4) was 62.5%.

Formation of Ink

An ink was formed in the same manner as in Example 2.

Production of Transparent Conductive Film

A transparent conductive film was produced and measured for the characteristics in the same manner as in Example 2. As a result of the measurement, the transparent conductive film having a surface resistance (sheet resistance) of 49 Ω/sq had a haze of 0.57% and a total light transmittance of 99.6%.

Example 5

A copolymer composition G constituted by a copolymer of vinylpyrrolidone and diallyldimethylammonium nitrate was prepared as an organic protective agent. The copolymer had a polymerization composition with 99% by mass of vinylpyrrolidone and 1% by mass of diallyldimethylammonium nitrate.

As a result of the measurement in the same manner as in Example 1, the copolymer composition G had a sulfur content Sppm of 626 ppm, a residual vinylpyrrolidone monomer content ratio $VP_R$ of 1.2%, and a weight average molecular weight Mw of 80,028. The ratio Sppm/Mw was 0.0078.

Synthesis of Silver Nanowires

Silver nanowires were synthesized in the same manner as in Example 3.

Cleaning

A "dispersion liquid after cleaning" was obtained in the same manner as in Example 2.

Crossflow Filtration

The crossflow filtration and the concentrating purification of the silver nanowire dispersion liquid were performed by using a tube of a porous ceramic filter in the same manner as in Example 2, so as to provide a "dispersion liquid after concentrating purification".

A small amount of a specimen was collected from the dispersion liquid after concentrating purification, and after evaporating water as the dispersion liquid on an observation table, was observed with a high-resolution FE-SEM (high-resolution field emission scanning microscope), resulting in that the silver nanowires had an average length of 20.8 μm, an average diameter of 27.9 nm, and an average aspect ratio of 20,800/27.9≈746. The yield of the silver nanowires according to the expression (4) was 61.8%.

Formation of Ink

An ink was formed in the same manner as in Example 2.

Production of Transparent Conductive Film

A transparent conductive film was produced and measured for the characteristics in the same manner as in Example 2. As a result of the measurement, the transparent conductive film having a surface resistance (sheet resistance) of 53 Ω/sq had a haze of 0.55% and a total light transmittance of 99.2%.

REFERENCE SIGN LIST

1 Porous ceramic tube
2 Upstream side flow channel tube
3 Downstream side flow channel tube
10 Tubular flow channel having porous ceramic filter on wall surface of channel
11 Upstream side end of filter
12 Downstream side end of filter
20 Circulation channel
21 Tank
22 Pump
23 Crossflow filter
24 Upstream side pressure gauge
25 Downstream side pressure gauge
26 Silver nanowire dispersion liquid before crossflow purification
27 Liquid medium to be replenished
30 Filtrate
31 Pore (void) of porous ceramic filter
32 Interior of tubular channel
60 Direction of flow
61 Particulate impurities
62 Short silver nanowires
63 Long silver nanowires

The invention claimed is:

1. Silver nanowires comprising covered thereon a copolymer composition containing one or more kinds of a copolymer having a vinylpyrrolidone structural unit, and having a sulfur content Sppm of 2,000 ppm or less and a residual vinylpyrrolidone monomer content ratio $VP_R$ defined by the following expression (1) of 6.0% or less, the silver nanowires having an average diameter of 30 nm or less and an average length of 10 μm or more:

$$VP_R(\%)=(2\times(A+B)/(3\times C))\times 100 \quad (1)$$

wherein A represents an integrated value of a peak (7.0 to 7.2 ppm) derived from methine protons of a C=C double bond of the vinylpyrrolidone monomer in an NMR spectrum of the copolymer composition; B represents an integrated value of a peak (4.3 to 4.4 ppm) derived from methylene protons of a C=C double bond of the vinylpyrrolidone monomer in the spectrum; and C represents an integrated value of a peak (3.0 to 3.4 ppm) derived from methylene protons adjacent to a N atom of the copolymer in the spectrum.

2. The silver nanowires according to claim 1, wherein the copolymer composition has a weight average molecular weight Mw of the copolymer of from 30,000 to 300,000.

3. The silver nanowires according to claim 1, wherein the copolymer composition has a ratio Sppm/Mw of the sulfur content Sppm (ppm) and a weight average molecular weight Mw of the copolymer of 0.040 or less.

4. The silver nanowires according to claim 1, wherein one or more kinds of the copolymer constituting the copolymer composition each have a polymerization composition with vinylpyrrolidone and one kind or two or more kinds of a monomer selected from a diallyldimethylammonium salt, ethyl acrylate, 2-hydroxyethyl acrylate, 2-hydroxyethyl methacrylate, 4-hydroxybutyl acrylate, N-methylmaleimide, N-ethylmaleimide, N-propylmaleimide, and N-tert-butylmaleimide.

5. A silver nanowire ink comprising a liquid medium and therein the silver nanowires according to claim 1 in an amount of from 0.02 to 5.0% by mass in terms of mass ratio of metallic silver.

6. A transparent conductive film comprising the silver nanowires according to claim 1 in a presence density of from 5 to 500 mg/m² in terms of mass of metallic silver.

7. The transparent conductive film according to claim 6, wherein the transparent conductive film has a surface resistance of 200 Ω/sq or less and a haze of 2.0% or less.

8. A method for producing silver nanowires, comprising reduction-depositing silver into a wire form in an alcohol solvent having dissolved therein a silver compound and an organic protective agent, the organic protective agent being a copolymer composition containing one or more kinds of a copolymer having a vinylpyrrolidone structural unit, and having a sulfur content Sppm of 2,000 ppm or less and a residual vinylpyrrolidone monomer content ratio $VP_R$ defined by the following expression (1) of 6.0% or less, the silver nanowires having an average diameter of 30 nm or less and an average length of 10 μm or more:

$$VP_R(\%)=(2\times(A+B)/(3\times C))\times 100 \quad (1)$$

wherein A represents an integrated value of a peak (7.0 to 7.2 ppm) derived from methine protons of a C=C double bond of the vinylpyrrolidone monomer in an NMR spectrum of the copolymer composition; B represents an integrated value of a peak (4.3 to 4.4 ppm) derived from methylene protons of a C=C double bond of the vinylpyrrolidone monomer in the spectrum; and C represents an integrated value of a peak (3.0 to 3.4 ppm) derived from methylene protons adjacent to a N atom of the copolymer in the spectrum.

9. The method for producing silver nanowires according to claim 8, wherein the copolymer composition has a weight average molecular weight Mw of the copolymer of from 30,000 to 300,000.

10. The method for producing silver nanowires according to claim 8, wherein the copolymer composition has a ratio Sppm/Mw of the sulfur content Sppm (ppm) and a weight average molecular weight Mw of the copolymer of 0.040 or less.

11. The method for producing silver nanowires according to claim 8, wherein one or more kinds of the copolymer constituting the copolymer composition each have a polymerization composition with vinylpyrrolidone and one kind or two or more kinds of a monomer selected from a diallyldimethylammonium salt, ethyl acrylate, 2-hydroxyethyl acrylate, 2-hydroxyethyl methacrylate, 4-hydroxybutyl acrylate, N-methylmaleimide, N-ethylmaleimide, N-propylmaleimide, and N-tert-butylmaleimide.

\* \* \* \* \*